(12) United States Patent
Almela

(10) Patent No.: US 6,824,691 B2
(45) Date of Patent: Nov. 30, 2004

(54) PROCESS FOR TREATING LIQUID MANURE

(76) Inventor: Jesus Martinez Almela, Plaza Tecuan 16, 12001 Castellon (ES)

(*) Notice: Subject to any disclaimer, the term of this patent is extended or adjusted under 35 U.S.C. 154(b) by 0 days.

(21) Appl. No.: 09/866,922

(22) Filed: May 30, 2001

(65) Prior Publication Data

US 2002/0096477 A1 Jul. 25, 2002

(30) Foreign Application Priority Data

Nov. 29, 2000 (ES) .......................................... 200002856

(51) Int. Cl.⁷ ............................................. C02F 1/56
(52) U.S. Cl. ........................... 210/705; 71/21; 210/710; 210/721; 210/734; 210/916
(58) Field of Search ............................. 71/21; 119/174; 210/705, 710, 721, 725, 727, 728, 734, 738, 905, 916

(56) References Cited

U.S. PATENT DOCUMENTS

| | | | | |
|---|---|---|---|---|
| 3,645,893 | A | * 2/1972 | Rohrer ....................... | 119/174 |
| 4,340,487 | A | * 7/1982 | Lyon .......................... | 210/705 |
| 5,776,350 | A | * 7/1998 | Miknevich et al. ......... | 210/710 |
| 5,914,040 | A | * 6/1999 | Pescher et al. ............. | 210/638 |
| 6,261,459 | B1 | * 7/2001 | Waldmann ................... | 210/666 |
| 6,409,788 | B1 | * 6/2002 | Sower .......................... | 71/11 |

FOREIGN PATENT DOCUMENTS

| | | |
|---|---|---|
| FR | 2 686 814 | 8/1993 |
| GB | 1 281 417 | 7/1972 |
| GB | 1 321 106 | 6/1973 |
| GB | 2 274 103 | 7/1994 |
| WO | WO 9521136 A | 8/1995 |
| WO | WO 0002441 A | 2/2000 |

OTHER PUBLICATIONS

R.M. Jones et al., "Dairy Wastewater Quality Improvement by Chemical and Physical Treatment," Agronomy Society Meetings 1999 Poster, 10 pages, URL:http://stephenville.tamu.edu/~rjones/poster.htm.

* cited by examiner

Primary Examiner—Peter A. Hruskoci
(74) Attorney, Agent, or Firm—Ostrolenk, Faber & Gerb & Soffen, LLP

(57) ABSTRACT

Process for treating liquid manure, comprising the introduction of homogenized liquid manure into a tank, into which are introduced some polymers/copolymers that bring about an interchange to produce the flocculation of colloidal substances and solids in suspension, which are then separated off with the aid of filters. The flocculation is carried out by feeding the liquid manure in at a constant flow rate and introducing the reagent at the same time in the form of a tertiary or quaternary polymer/copolymer, stirring the mixture for a time of between 5 and 15 minutes and then eliminating the suspended solids by flotation, involving the coalescence of the colloidal particles.

2 Claims, No Drawings

PROCESS FOR TREATING LIQUID MANURE

BACKGROUND OF THE INVENTION

The present invention relates to a process for treating liquid manure in order to obtain liquid and solid residues that can be used directly and/or processed by a simple method to prepare useful by-products for various applications.

Liquid manure is known to be the liquid waste obtained on farms practicing intensive animal husbandry. Some of its constituents are feces and urine, which vary with the physiological characteristics of the animals in question, with the feeding regime used, and with the type of animal husbandry practiced. These excrements undergo a series of chemical transformations, owing to microbial fermentation processes, involving hydrolysis. Liquid manure also contains some lost cleaning water, lost drinking water, water lost from the feed, and water used for the cleaning and disinfection of the animal houses. The result of this extra water and the chemical transformations is a product that varies with the characteristics of the method of collecting, extracting and storing this effluent. In view of its quantities, liquid manure causes major environmental contamination, and it is particularly difficult to handle and deal with, because its dry-matter content varies from 1% to 7% in the case of liquid pig manure and from 10% to 20% in the case of liquid cattle manure. Liquid manure is therefore basically a foul-smelling liquid with a low dry-matter content but with a large amount of suspended particles in the colloidal state. These particles come from organic plant nutrients, trace elements and carbon-containing reduced materials. It is therefore important to treat liquid manure in order to eliminate these substances from it and, even more, to convert it into usable materials or by-products.

Apart from its direct application to the fields, liquid manure is traditionally subjected to various means of handling and treatment. Almost all these are based on separation processes, using various mechanical, physical, chemical and mixed methods. However, these separation processes have proved to have a low efficiency of about 5–15%. In addition, one has to bear the cost of the inorganic reagents needed for the chemical coagulation and flocculation. Furthermore, the large amount of additives needed is an environmental disadvantage. Various processes are already known for the treatment of liquid manure. These generally start with the separation of the liquid and solid phases, after which these two phases are treated differently, according to the process employed.

In some cases the separate phases are subjected to a thermal treatment to obtain a dry or half-dry residue, and Spanish Patent No. P 9600968 can be cited in this connection. However, this is an expensive process, because of the large amount of heat required, apart from which its environmental rating is doubtful.

In other cases, the liquid phase is subjected to biological purification, and European Patent EP 0558421 and Spanish Patents Nos. 9402528, 9601316 and 9702540 can be cited in this connection. However, these processes call for the prior treatment of the solid and the liquid phase, are slow, and require large and expensive equipment. In addition, they are very sensitive to variations in the charge (due to the variability of liquid manure), to the high toxicity of the trace elements in it and to the toxicity for the microorganisms involved in the biological process, because of its antibiotic content.

Finally, there are some known processes for the treatment of liquid manure that use precipitation with an electrically charged flocculent, as described in European Patents EP 0508023 and EP 0508024. However, the precipitation of liquid manure with flocculants by the methods described in these patents is not as effective as it should be, because the addition of the flocculant is not carried out in a situation that is the most suitable for the liquid manure, and furthermore the result of the process varies with the type of reagent used. It should be stressed that the use of flocculants generally does not guarantee precipitation, because no account is taken here of the variability of liquid manure and especially its total suspended solid (TSS) content and—within this—its volatile suspended solid (VSS) content, or of the relationship between these and the plant nutrients (nitrogen, phosphorus and potassium), the trace elements (zinc, copper and chromium), and the remaining mass (in terms of total organic carbon or TOC), as well as the chemical oxygen demand (COD) and the biological oxygen demand (BOD), which are almost entirely due to colloidal and dissolved matter. One of the reasons for this is that chemical precipitation of colloidal and/or dissolved substances is extremely difficult.

SUMMARY OF THE INVENTION

The aim of the present invention is to provide a process for the treatment of liquid manure by homogenizing the liquid manure and by the ionic transfer of electrons using organic polymers (polyacrylamide) according to the physicochemical characteristics of the colloids contained in the homogenized liquid manure to be treated. Owing to the use of a specific method, the controlled mixing of the polymers and the liquid manure brings about the formation of soluble molecules activating the copolymers, with the activation of long molecular chains, which destabilize the charged particles in the suspension, absorb them and form molecular bridges between the various suspended particles. The final result is that particle agglomerates are formed, giving large and firm floccules. This new physical form enables the resulting solids to be treated efficiently and separated from the liquid phase by a special method of removal. This gives final liquid and solid fractions that can be used either directly or after the application of a simple treatment or well-known customary operations. Treatment with polyacrylamide is not only highly effective for the agglomeration of colloids and the solids in suspension and for separating the organic nutrients from the liquid manure but it also needs only a very small amount of additives (polymers and copolymers), which is advantageous and sustainable from the environmental point of view, which is a requirement.

DETAILED DESCRIPTION OF EMBODIMENTS OF THE INVENTION

The process according to the present invention involves the joint application of certain chemical, physicochemical, mechanical and hydraulic means that bring about the ionic transfer of the nutrients and trace elements present in the liquid manure into the solid fraction in a controlled medium during the solid/liquid separation, after which the bacterial charge and the foul smell are eliminated by oxidation in a reducing medium.

The process of the invention scores over the known methods when applied to the treatment of farm effluents containing a large amount of nutrients, trace elements and microorganisms.

The advantages mentioned above and the other advantages of the process according to the invention are achieved by the use of certain reagents in the flocculation stage, which are efficient, economical, degradable and harmless for the environment. They permit the use of a highly cationic component thanks to the correct adjustment of the quantities under constant and controlled conditions of temperature, light, flow rate and stirring velocity.

For this purpose, a first feature of the invention is that the liquid manure coming from the storage vessel is treated in a tank into which the liquid manure is fed at a constant rate and into which the reagent is introduced at the same time in the form of a certain polymer and/or copolymer whose tertiary or quaternary composition is chosen according to the nature of the liquid manure to be treated. This reagent is added in a quantity of 80–140 ppm, and the liquid manure and the reagent are stirred in this tank for a time varying from 5 to 15 minutes—variables that determine the reaction kinetics (temperature, absence of direct sunlight, velocity of stirring the reactor, concentration of the total suspended solids, and the density of the liquid manure introduced).

In this stage, the cationic additive forms molecular bridges via rupture and recombination both between the molecules and between the particles and floccules, which adhere to the absorbent surfaces of the colloids and form larger flocculated lumps.

Coagulation also takes place, increasing the ionic transfer and influencing the reaction rate (making the flocculation faster) and/or the quality of the floccules, as well as the physical form of the final solid fraction. The resulting floccules are heavier, bulkier, more uniform, and they can be more easily dehydrated in a subsequent stage. The liquid phase obtained is also cleaner, which permits more efficient elimination of the floating microfloccules.

The resulting fractions are almost entirely devoid of microorganisms. Furthermore, there is a large reduction in the chemical oxygen demand (COD), the biological oxygen demand (BOD) and the nitrogen and phosphorus levels, with the removal of almost all the volatile fatty acids contained in the volatile suspended solids (VSS) and the total suspended solids (TSS). This means that the fractions obtained are practically free of a foul smell. The degradation is effected by mechanical, chemical or biological means, according to the temperature, the conditions of light, and the pH of the substrate used.

Another feature of the invention is that the remaining solids in suspension are eliminated from the abovementioned liquid phase by flotation, with the coalescence of the remaining colloidal particles.

The liquid fraction obtained in the process according to the invention can be subjected to subsequent treatments that are well known from the prior art and which make it possible to release the water into public waterways or to use it for irrigation. Thus, the liquid fraction formed in the process can be passed through a unit for the reduction of ammoniacal nitrogen if its concentration exceeds a set value. Similarly, the liquid phase can be subjected to biological purification, using e.g. a trickling filter, a set of biological reactors that are sequentially anaerobic, oxic and anoxic, or reactors containing nitrifying bacteria that are fixed on polyvinyl alcohol gel beads permeable to carbon dioxide, nitrogen and phosphorus. Optionally, a bactericidal substance is added to the liquid following a removal of suspended solids.

The solid fraction obtained in the process according to the invention can be directly applied to the fields as manure or used for this purpose in the dry form obtained by a suitable drying process employing mechanical or even thermal means. The dry residue can also be subjected to a composing process either in the open air or in a controlled atmosphere.

EXAMPLE

The process according to the invention can be illustrated in the case of the laboratory equipment that was used to find the best polymer. This was done with the aid of a tank that was fitted with a slow stirrer and into which the reagent and the liquid manure were introduced in the center.

In more concrete terms, a dosing device was used in the experiment that fed in an aqueous solution of the reagent at a rate of 3 grams per liter, the reagent being a tertiary polymer with ammonium salts and sulfate groups. The polymer was added to the liquid manure in a concentration of 100–140 ppm.

After the ionic transfer reaction, the solid and liquid phases were separated with a commercial drum-type filter having 0.25 mm apertures, which removed virtually all the solids from the liquid.

The solid fraction was in turn subjected to concentration by passing it through a vibrating screen with 1×1 mm apertures. This helped to eliminate the excess liquid, which was recycled to the beginning of the process.

The results obtained by this treatment are listed below.

Results obtained by processing 1 tonne (100%) of raw liquid manure

| Parameter | Concentration | Units | Amount |
| --- | --- | --- | --- |
| pH | 7.57 | | |
| Chemical oxygen demand (COD) | 26,995.00 | ppm | 26.99 kg |
| Biological oxygen demand ($BOD_5$) | 14,836.15 | ppm | 14.84 kg |
| Total suspended solids (TSS) | 16,539.29 | mg/l | 16.54 kg |
| Ammonia | 3783.62 | mg/l | 3.78 kg |
| Sulfate | 229.44 | mg/l | 0.229 kg |
| Chlorine | 1408.78 | mg/l | 1.408 kg |
| Phosphorus | 415.39 | mg/l | 0.415 kg |
| Nitrate | 0.68 | mg/l | 0.68 g |
| Chromium | 0.22 | mg/l | 0.22 g |
| Zinc | 56.10 | mg/l | 56.10 g |
| Copper | 8.88 | mg/l | 8.88 g |
| Iron | 7.22 | mg/l | 7.22 g |
| Calcium | 645.74 | mg/l | 645.74 g |
| Potassium | 1627.74 | mg/l | 1.63 kg |

Characteristics of the liquid phase, obtained in an amount of 80%

| Parameter | Concentration | Units | Amount |
| --- | --- | --- | --- |
| pH | 7.77 | | |
| Chemical oxygen demand (COD) | 2869.73 | ppm | 2.30 kg |
| Biological oxygen demand ($BOD_5$) | 2364.60 | ppm | 1.89 kg |
| Total suspended solids (TSS) | 484.04 | mg/l | 387.23 g |
| Ammonia | 1121.71 | mg/l | 0.90 kg |
| Sulfate | 249.94 | mg/l | 0.20 kg |
| Chlorine | 836.22 | mg/l | 0.67 kg |
| Phosphorus | 45.18 | mg/l | 36 g |
| Nitrate | 0.26 | mg/l | 0.20 g |
| Chromium | 0.08 | mg/l | 0.064 g |
| Zinc | 2.83 | mg/l | 2.26 g |
| Copper | 0.40 | mg/l | 0.32 g |
| Iron | 1.11 | mg/l | 0.89 g |
| Calcium | 164.84 | mg/l | 131.87 g |
| Potassium | 1.192 | mg/l | 953.6 g |

Characteristics of the solid phase, obtained in an amount of 20%

| Parameter | Concentration | Units | Amount | |
|---|---|---|---|---|
| pH | 7.12 | pH | | |
| Conductivity | 2422.00 | µS/cm² | | |
| Water content | 85.00 | % | | |
| Dry-matter content | 22.00 | % | 44.00 kg | |
| Residue after heating to 600° C. | 5.18 | % | 10.36 kg | |
| Organic carbon | 41.25 | % dry matter | 12.37 kg | |
| Total nitrogen (dry matter) | 3.35 | % dry matter | 1.00 kg | |
| Total phosphorus | 1.51 | % dry matter | 0.45 kg | |
| Total potassium | 0.95 | % dry matter | 0.29 kg | |
| Rate of humification | 0.5 | % | | |
| Degree of humification | 52.17 | MPN/g (dry matter) | | |
| Carbon/nitrogen ratio | 9.9 | | | |
| Total organic matter | 59.8 | dry matter | 17.64 kg | |
| Degree of stability | 28 | % | | |
| Germination index | 26 | % | | |
| Cadmium | 5.2 | mg/kg (dry matter) | 156 mg | |
| Copper | 396 | mg/kg (dry matter) | 11.88 g | |
| Nickel | 30.6 | mg/kg (dry matter) | 918 mg | |
| Lead | 43.7 | mg/kg (dry matter) | 1.31 g | |
| Zinc | 2049.8 | mg/kg (dry matter) | 61.5 g | |
| Mercury | 0 | mg/kg (dry matter) | 0 g | |
| Chromium | 21.7 | mg/kg (dry matter) | 651 mg | |

What is claimed is:

1. A process for treating liquid manure consisting of:

homogenizing the liquid manure;

introducing the homogenized liquid manure into a tank at a relatively constant flow rate into which a tertiary or quaternary polyacrylamide is introduced in an amount of between 80 ppm and 140 ppm and stirring for a time ranging from 5 to 15 minutes to bring about an interchange of electrons so that molecular bridge are formed and colloids and solids in suspension are flocculated;

separating the solids from the liquid;

eliminating any remaining solids in suspension from the liquid by flotation and coalescence of colloidal particles;

removing suspended solids from the liquid; and, optionally, adding a bactericidal substance following the removal of the suspended solids from the liquid.

2. The process of claim 1 wherein the polyacrylamide is in an aqueous solution of at a concentration of between 3 and 4 grams per liter of water employed, and is directly mixed with the liquid manure.

* * * * *